United States Patent [19]

Ratcliffe et al.

[11] 4,140,752

[45] Feb. 20, 1979

[54] PROCESS FOR REMOVING SULFUR DIOXIDE FROM WASTE GASES

[75] Inventors: Charles T. Ratcliffe; Geza Pap, both of Morristown, N.J.

[73] Assignee: Allied Chemical Corporation, Morris Township, Morris County, N.J.

[21] Appl. No.: 818,624

[22] Filed: Jul. 25, 1977

[51] Int. Cl.$^2$ .................... B01D 53/34; C01B 17/68
[52] U.S. Cl. ................................. 423/244; 423/535; 423/539
[58] Field of Search .............. 423/244, 533, 535, 538; 252/447, 456, 464; 55/73

[56] References Cited

U.S. PATENT DOCUMENTS

| 3,454,356 | 7/1969 | Raman | 423/244 |
| 3,667,910 | 6/1972 | Eguchi | 423/244 X |
| 3,987,153 | 10/1976 | Stiles | 423/244 X |

FOREIGN PATENT DOCUMENTS 48-7994  4/1973  Japan ............................. 423/244

Primary Examiner—Earl C. Thomas
Attorney, Agent, or Firm—Robert A. Harman; Robert J. North

[57] ABSTRACT

A catalyst/adsorbent for sulfur dioxide from waste gases, via oxidation thereof to sulfur trioxide, comprising vanadium oxide supported on activated carbon, promoted by nickel sulfate or potassium sulfate, or preferably by both.

3 Claims, No Drawings

PROCESS FOR REMOVING SULFUR DIOXIDE FROM WASTE GASES

BACKGROUND OF THE INVENTION

This invention relates to an improved catalyst and adsorbent composition for removal of sulfur dioxide from waste gases, such as gases containing not over 10% by volume of sulfur dioxide, said catalyst/adsorbent being composed of activated carbon with a vanadium compound supported thereon. More particularly, the invention relates to improvments of such catalyst/adsorbent by promotion thereof by use of a nickel compound, a potassium compound, or preferably mixtures thereof.

Use of a catalyst/adsorbent of sulfur dioxide, composed of activated carbon and a vanadium compound supported thereon is known, e.g. from U.S. Pat. No. 3,667,910 of June 6, 1972 to Y. Eguchi. Moreover the further activation of such activated carbon/vanadium compound adsorbent is shown in German patent publication DOS 2253536 published May 24, 1973, wherein use of a phosphorus compound and/or tin compound and/or boron compound together with the vanadium and the activated carbon support is proposed.

The subject adsorption of sulfur dioxide is taught in the prior art as involving oxidation of the sulfur dioxide to sulfur trioxide, which in the presence of water is converted to sulfuric acid. The waste gases containing less than 10% by volume of sulfur dioxide, to which such processes are applicable, generally contain sufficient oxygen for the requisite oxidation of sulfur dioxide; or if not, the oxygen can be added as oxygen of air or otherwise. Usually, also, water is present in such gases and presence of water is desirable in such adsorption process.

SUMMARY OF THE INVENTION

In accordance with the present invention, an improved catalyst/adsorbent composition for removal of sulfur dioxide from waste gases, via oxidation of sulfur dioxide to sulfur trioxide at temperatures in the range of 90° C. to 200° C. and adsorption of the sulfur trioxide as such and/or as sulfuric acid is provided; together with process of adsorption of such sulfur dioxide using such adsorbent composition. The improvement comprises including in such composition of vanadium compound supported on activated carbon, an effective proportion of a nickel compound and/or a potassium compound as a promoter. In general the total weight of all of the metal compounds, calculated as oxides, will be in the range of 0.01 to 25 percent based on the weight of the activated carbon support. It will be understood that such weights are limited only by the weights of these compounds which can be introduced without blocking off the pores of the support; and that whatever nickel or potassium salts are used, they are converted to sulfates in the $SO_2$/oxygen environment existing during the adsorption process.

PREFERRED EMBODIMENTS

Preferably the adsorbent of the invention includes both nickel and potassium compounds as promoters, in weight proportions in the ranges, calculated as the oxides, of 0.01 to 2 parts as NiO and 0.1 to 5.4 parts as $K_2O$ for 1 part of $NH_4VO_3$. The total weight of the metallic ingredients, calculated as the oxides, is preferably in the range of 0.01 to 10% based on the weight of the activated carbon support.

The activated carbon support can be any type of conventional activated carbon prepared from materials such as coal, wood, nutshells and the like. Desirably, the activated carbon support has relatively high surface area in the range of 600-2000 sq.m./gm. A particularly preferred activated carbon is derived from bituminous coal.

In the preferred process wherein the above adsorbent composition is utilized to remove sulfur dioxide from power plant flue gas, the waste gas contains not over 1% by volume of sulfur dioxide.

The adsorbent of the invention can be prepared by impregnating activated carbon with compounds of vanadium, nickel and/or potassium by conventional procedures. In particular the support can be impregnated at room temperature with an aqueous solution of a vanadium compound such as ammonium metavanadate or other soluble vanadium salt, a nickel compound such as nickel sulfate, and a potassium compound such as potassium sulfate. Then the wet material that is obtained is dried and is heated at a temperature such as 250°–700° C. as disclosed in the above noted U.S. Pat. No. 3,667,910.

The examples which follow are illustrative of our invention and of the best mode contemplated by us for practicing the same, but are to be interpreted as illustrative and not as limiting.

PREPARATION OF ADSORBENTS

Each of several aqueous solutions of $NH_4VO_3$ plus $NiSO_4$ plus $K_2SO_4$, containing the below stated weights of each ingredient, was stirred at room temperature for several hours with 20 gm. of activated carbon derived from bituminous coal, having internal surface area (BET method) of 1050-1150 sq.m./gm. The wet impregnated activated carbon was subsequently dried and was heated to 500° C. in a nitrogen atmosphere.

TEST METHOD

A six-gram sample of each preparation was placed in a U-tube of 0.4 cm. diameter supported in a heated oil bath maintained at a constant temperature of 130° C. A stack gas containing 0.4% by volume of $SO_2$ was introduced into the tube at a flow rate of 700 cc/min. The $SO_2$ concentration in the exit gas was monitored with a photometric analyzer (duPont #411) to determine the time interval in each test, from start of the gas flow to first appearance of $SO_2$ in the exit gas ("Breakthrough time"). The results are tabulated below.

Table

| Run No. | Wgt. of Ingredients (gm./100 gm. carbon) | | | Breakthrough Time (min) |
|---|---|---|---|---|
| | $NH_4VO_3$ | $K_2SO_4$ | $NiSO_4\ 6H_2O$ | |
| 1. | 2.0 | 0 | 0 | 63 |
| 2. | " | 1.0 | 0 | 75 |
| 3. | " | 5.0 | 0 | 90 |
| 4. | " | 10.0 | 0 | 100 |
| 5. | " | 0 | 0.11 | 80 |
| 6. | " | 0 | 0.55 | 77 |
| 7. | " | 0 | 2.75 | 90 |
| 8. | " | 0 | 13.8 | 52 |
| 9. | " | 10.0 | 5.0 | 121 |
| 10. | 0 | 10.0 | 5.0 | 15 |

As for the adsorbents of the above U.S. Pat. No. 3,667,910 (vanadium oxide supported on activated carbon) the present adsorbents can be regenerated, with recovery of strong $SO_2$ gas (together with minor amounts of COS and $H_2S$), by contacting the adsorbent, after it has adsorbed sulfur oxides, with carbon monoxide or a mixture thereof with hydrogen.

We claim:

1. In a process for removal of sulfur dioxide from waste gases containing not over 10% by volume of sulfur dioxide, involving oxidation of sulfur dioxide to sulfur trioxide and adsorption, at temperatures not above 200° C., on an adsorbent composition comprising vanadium compound supported on activated carbon; the improvement which comprises including in the adsorbent composition, an effective proportion of both a nickel compound and a potassium compound as promoter of such adsorbent composition.

2. Process of claim 1 wherein the activated carbon support is derived from bituminous coal.

3. Process of claim 2 wherein the waste gas contains not over 1% by volume of sulfur dioxide.

* * * * *